United States Patent
Lu et al.

(10) Patent No.: US 10,165,275 B2
(45) Date of Patent: Dec. 25, 2018

(54) CONTENT-ADAPTIVE RESHAPING FOR HIGH DYNAMIC RANGE IMAGES

(71) Applicant: DOLBY LABORATORIES LICENSING CORPORATION, San Francisco, CA (US)

(72) Inventors: Taoran Lu, Santa Clara, CA (US); Fangjun Pu, Sunnyvale, CA (US); Peng Yin, Ithaca, NY (US); Tao Chen, Palo Alto, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 165 days.

(21) Appl. No.: 15/410,563

(22) Filed: Jan. 19, 2017

(65) Prior Publication Data
US 2017/0214916 A1    Jul. 27, 2017

Related U.S. Application Data

(60) Provisional application No. 62/287,280, filed on Jan. 26, 2016.

(30) Foreign Application Priority Data

May 17, 2016 (EP) .................................. 16169907

(51) Int. Cl.
*H04N 19/124* (2014.01)
*G06T 5/00* (2006.01)
(Continued)

(52) U.S. Cl.
CPC .......... *H04N 19/124* (2014.11); *G06T 5/007* (2013.01); *H04N 19/17* (2014.11); *H04N 19/182* (2014.11);
(Continued)

(58) Field of Classification Search
None
See application file for complete search history.

(56) References Cited

U.S. PATENT DOCUMENTS

| | | | |
|---|---|---|---|
| 2014/0185664 A1* | 7/2014 | Van Der Auwera | ... H04N 19/50 375/240.02 |
| 2016/0014420 A1 | 1/2016 | Su | |
| 2016/0134870 A1 | 5/2016 | Lu | |

FOREIGN PATENT DOCUMENTS

| | | |
|---|---|---|
| EP | 1413985 | 4/2004 |
| WO | 2014/130343 | 8/2014 |

(Continued)

OTHER PUBLICATIONS

Minoo, K. et al "Description of the Reshaper Parameters Derivation Process in ETM Reference Software" JCTVC of ITU-T SG 16 WP3 and ISO/IEC JTC 1/SC 29/WG11, 23rd meeting: San Diego, USA Feb. 19-26, 2016.

(Continued)

*Primary Examiner* — Mohammad J Rahman (57) ABSTRACT

A processor for forward reshaping to a target bit depth receives an input image with an input bit depth. The input luminance range is divided into luminance bands and each band is assigned a visual importance index. The output codewords at the target bit depth are divided into codeword bins and each bin is assigned to one of the luminance bands. Each codeword bin is assigned the visual importance index of the luminance band it belongs. Each bin is allocated a number of reshaped codewords according to its visual importance index and a codeword mapping function, where bins with the highest importance index are allocated more codewords than the other bins. A signal reshaping function is generated based on the allocation of codewords, and the (Continued)

reshaping function is applied to the input image to generate an output image in the target bit depth.

15 Claims, 3 Drawing Sheets

(51) Int. Cl.
  *H04N 19/182* (2014.01)
  *H04N 19/169* (2014.01)
  *H04N 19/186* (2014.01)
  *H04N 19/17* (2014.01)
  *H04N 19/30* (2014.01)
  *H04N 19/85* (2014.01)
  *H04N 19/98* (2014.01)

(52) U.S. Cl.
  CPC ....... *H04N 19/186* (2014.11); *H04N 19/1887* (2014.11); *H04N 19/30* (2014.11); *H04N 19/85* (2014.11); *H04N 19/98* (2014.11); *G06T 2207/20208* (2013.01)

(56) References Cited

FOREIGN PATENT DOCUMENTS

| WO | 2014/204865 | 12/2014 |
|---|---|---|
| WO | 2016/140954 | 9/2016 |

OTHER PUBLICATIONS

Lu, T. et al "Implication of High Dynamic Range and Wide Color Gamut Content Distribution" Proc. of SPIE, vol. 9599, Sep. 22, 2015, pp. 95990B1-95990B11.

Lee, S. et al CE2-related: Report of LumaATF with Luma-Driven Chroma Scaling (LCS) ISO/IEC JTC1/SC29/WG11, Oct. 2015, pp. 1-5.

Pu, F. et al "Comments on Reshaping for HDR/WCG Compression" ISO/IEC JTC1/SC29/WG11 MPEG2015/M37267, Oct. 2015, Geneva, Switzerland, pp. 1-6.

Stessen, J. et al "Chromaticity Based Color Signals for Wide Color Gamut and High Dynamic Range" MPEG Meeting, ISO/IEC JTC1/SC29/WG11, No. M35065, Oct. 1, 2014.

Ebner, F. et al "Development and Testing of a Color Space (IPT) with Improved Hue Uniformity" Color Science, Systems and Applications: Final Program and Proceedings of IS&T/SID sixth color Imaging Conference, Nov. 1, 1998, pp. 8-14.

Borji, A. et al "State-of-the-Art in Visual Attention Modeling" IEEE Transactions on Pattern Analysis and Machine Intelligence, vol. 35, No. 1, Jan. 2013, pp. 185-207.

ITU-R BT.1886, "Reference Electro-Optical Transfer Function for Flat Panel Displays used in HDTV Studio Production" Mar. 2011, pp. 1-7.

SMPTE ST 2084:2014 "High Dynamic Range Electra-Optical Transfer Function of Mastering Reference Displays" Aug. 16, 2014, pp. 1-14.

Minoo, K. et al "Exploratory Test Model for HDR Extension of HEVC" ISO/IEC JTC1/SC29/WG11 MPEG2014/N15792, Oct. 2015, Geneva, CH, pp. 1-5.

* cited by examiner

CONTENT-ADAPTIVE RESHAPING FOR HIGH DYNAMIC RANGE IMAGES

CROSS-REFERENCE TO RELATED APPLICATIONS

This application claims priority to U.S. Provisional Patent Application No. 62/287,280, filed on Jan. 26, 2016 and European Patent Application No. 16169907.9, filed on May 17, 2016, each of which is incorporated herein by reference in its entirety.

TECHNOLOGY

The present invention relates generally to images. More particularly, an embodiment of the present invention relates to content-adaptive reshaping of images with high dynamic range.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR.

As used herein, the term "forward reshaping" denotes the process of mapping (or quantizing) an HDR image from its original bit depth to an image of a lower or the same bit depth to allow compressing the image using existing coding standards. In a receiver, after decompressing the reshaped signal, the receiver may apply an inverse reshaping function to restore the signal to its original high dynamic range. As appreciated by the inventors here, improved techniques for the reshaping of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Signal reshaping techniques for coding high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to signal reshaping of HDR images. A processor for forward reshaping to a target bit depth receives an input image with an input bit depth that is equal or higher than a target bit depth. The input luminance range is divided into luminance bands and each band is assigned a visual importance index. The range of output codeword values at the output bit depth is divided into codeword bins and each bin is assigned to one of the luminance bands. Each codeword bin is assigned the visual importance index of the luminance band it belongs. Each bin is allocated a number of codewords in the target bit depth according to its visual importance index and a codeword mapping function, where bins with the highest importance index are allocated more codewords than the other bins. A signal reshaping function is generated based on the allocation of codewords, and the signal reshaping function is applied to the input image to generate an output image in the target bit depth.

In another embodiment, a reshaped image is coded by an encoder. The encoder determines the visual importance of each luminance range in the reshaped image based on its forward reshaping function, a corresponding inverse reshaping function, or the original visual importance indices used to determine the forward reshaping function. For a coded region in the reshaped image, the encoder determines a measure of luminance of the pixels in the region and then adjusts the quantization of the coded region according to the measure of luminance and its corresponding visual importance.

Example Video Delivery Processing Pipeline

Figure 1A:
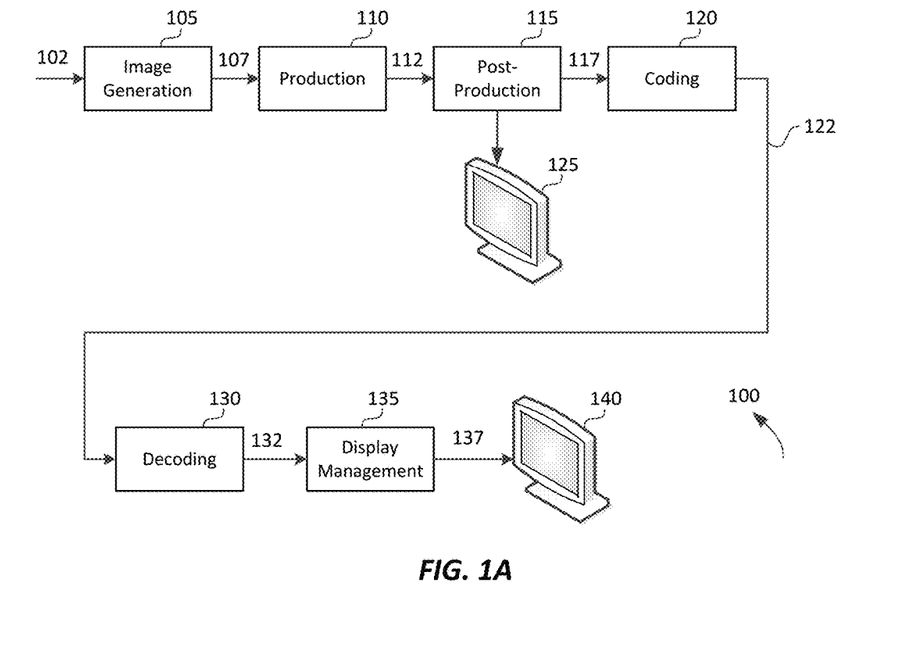
FIG. 1A depicts an example process for a video delivery pipeline.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 $cd/m^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of a PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 $cd/m^2$, one 12-bit code value corresponds to a relative change of approximately 0.0048 $cd/m^2$; however, at 1,000 $cd/m^2$, one 12-bit code value corresponds to a relative change of approximately 2.24 $cd/m^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive Quantization (CAQ)" or "Content-adaptive reshaping," denote methods to adaptively adjust the perceptually quantization of images based on their content.

Figure 1B:
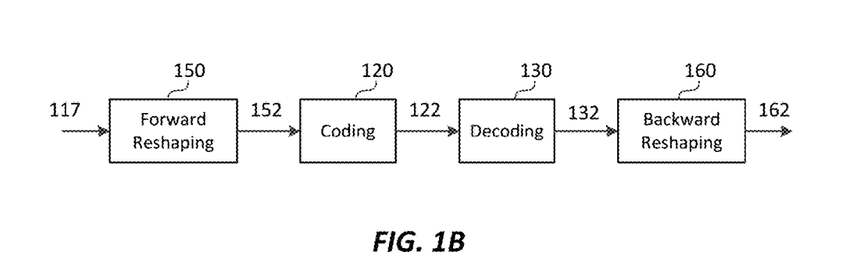
FIG. 1B depicts an example process for data compression using signal reshaping according to an embodiment of this invention.

FIG. 1B depicts an example process for signal reshaping according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ), for further downstream processing, such as the display management process (135) discussed earlier. In some embodiments, the backward reshaping function (160) may be integrated with a de-quantizer in decoder (130), e.g., as part of the de-quantizer in an AVC or HEVC video decoder.

An example of a signal reshaping function based on a power function was presented in U.S. patent application Ser. No. 14/771,101, to be referred as the '101 Application, filed on Aug. 27, 2015, "Encoding perceptually-quantized video content in multi-layer VDR coding," (published as US2016/0014420), which is incorporated herein by reference in its entirety. In '101, given an input pixel value x, the reshaped pixel output y is computed according to the power function $$y = a(x+b)^a + c, \tag{1}$$

where a, b, and c are variables based on the input dynamic range and the target dynamic range within a frame or a scene, and the exponent a is adjusted according to a quantization criterion. One drawback of this power function is that it adjusts codewords globally in a relatively coarse scale. In practice, a reshaping function may be transmitted from an encoder to the decoder using a piecewise polynomial which allows greater flexibility in defining its characteristics. Examples of such representations are discussed by F. Pu et al., "Comments on reshaping for HDR/WCG compression," ISO/IEC JTC1/SC29/WG11 MPEG2015/M37267, October 2015, Geneva, Switzerland, which is incorporated by reference in its entirety.

Another example of determining a signal reshaping function was presented in U.S. Provisional Patent Application Ser. No. 62/126,925, filed on Mar. 2, 2015, "Content-adaptive perceptual quantizer for high dynamic range images," by J. Froehlich et al., which is incorporated herein by reference in its entirety, to be referred to as the '925 Application, or the CAQ method. According to the CAQ method, the reshaping function is computed according to a noise mask histogram of the input image.

Signal Reshaping Based on Visual Importance

Consider, without loss of generality, a target bit depth of 10 bits. For typical 12-16 bit HDR images, experiments with the CAQ method indicated that certain luminance ranges may be represented with lower than 10 bits without loss in image quality. For example, camera signals tend to contain high levels of noise in the darks. Hence, dark areas may be represented at lower bit depths without visual artifacts. In an embodiment, a reshaping function is generated so that more codewords are allocated to those luminance ranges that are deemed the most visually important according to either objective or subjective criteria.

Figure 2:
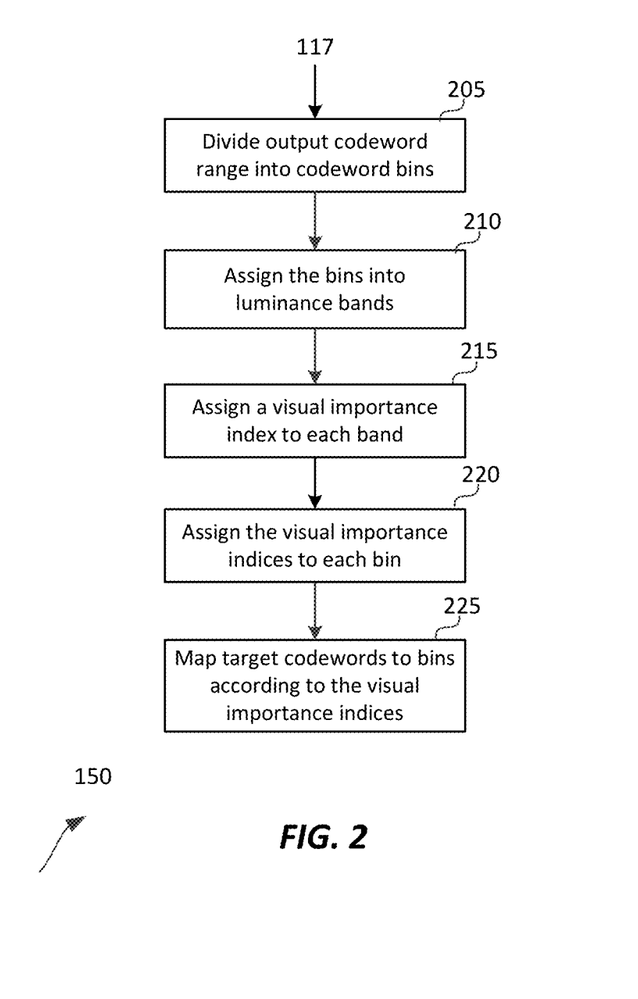
FIG. 2 depicts an example process for determining a signal reshaping function according to an embodiment of this invention.

FIG. 2 depicts an example process (150) for determining a signal reshaping function according to an embodiment of this invention. As depicted in FIG. 2, given a sequence of images (e.g., video frames) (117), in block (205), the input luminance range (e.g., as defined by ST. 2084, 0-10,000 nits) is non-linearly quantized to PQ codeword values with output bit-depth $B_T$, and is divided into N codeword bins (e.g., N=32). In a preferred embodiment, all codeword bins are equal in size (e.g., N is a power of two). Given N and $B_T$, the initial allocation of codewords for each bin at the target bit depth is given by $$M = \frac{2^{B_T}}{N}. \tag{2}$$

For example, for $B_T$=10 and N=32, M=32.

Given a range of allowed luminance values, say 0 to 10,000 nits, in step (210), this range is divided into K luminance bands (e.g., $b_m$, for m=1 to K). The division into luminance bands may be based on luminance characteristics of the signal (e.g., its minimum and maximum luminance, luminance histograms, and the like), pixel value variances, or other objective or subjective metrics. For example, in an embodiment, one may define K=15 luminance bands as determined by the array band_edges[ ]

band_edges=[0 0.1 1 5 10 20 50 70 100 200 350
    500 1,000 2,000 4,000 10,000], (3a)

where values are in nits. In an embodiment, the band edges may be adjusted according to the input EOTF to align with the bin edges. This is to ensure that each band contains an integer number of bins. Alternatively, a bin that may intersect two luminance bands may be assigned to one of the two, so that each bin is assigned to only one band. For example, in an embodiment, after adjustment, the actual band_edges array may be given by band_edges=[0 0.1009 1.1329 5.1719 11.7855
    17.1973 48.7758 67.5186 92.6985 231.2106
    310.7651 556.6190 990.0144 1756.7867
    4173.1670 10,000]. (3b)

In this example, from equation (3b), $b_1$=[0, 0.1009), $b_2$=[0.1009 1.1329), and $b_{15}$=[4,173.167 10,000]. From equations (2) and (3), one can associate each of the codeword bins with a luminance band. For example, $b_1$ may include the first two codeword bins, b2 may include the next two bins, and $b_{15}$ may include the last 3 bins. As used herein, the term "visual importance index" is a pre-determined value for each band indicating the visual importance of each luminance band. Consider, without loss of generality, a visual rating range $[R_{min}\ R_{max}]$, where $R_{min}$ (e.g., $R_{min}=0$) indicates a band of no visual importance and $R_{max}$ (e.g., $R_{max}=5$) indicates a band of the most visual importance. Let $R_m \in (R_{min}\ R_{max})$ denote the visual importance index associated with the m-th band. For example, for a visual rating range in [0 5], a visual importance array of $$R=[1\ 2\ 5\ 5\ 5\ 5\ 5\ 4\ 4\ 4\ 4\ 5\ 5\ 2\ 0]$$

indicates that from a visual importance point of view, band $b_{15}=[4,000\ 10,000]$ (that is, extreme highlights) is the least important band and that bands $b_3$-$b_7$ and $b_{12}$-$b_{13}$ are the most important bands. In general, $R_m$ values may be determined using any suitable objective or subjective criteria, such as artistic intent, a measure of picture quality (such as Peak Signal to Noise Ratio (PSNR)), a subjective quality measure, and the like. Given the $R_m$ values specified in step (215), and the original codeword bins, in step (220), one can associate now a visual importance index for each bin. For example $$\text{if bin}[i]\text{ belongs to band }b_j,\ R\_bin[i]=R_j,\text{ for }i=0, 1, 2, \ldots, N-1, \quad (4)$$

where R_bin[i] denotes the visual importance of the i-th bin.

In another embodiment, one may bypass the bins-to-bands association step (210), and assign directly a visual importance index to each codeword bin either directly or by using some alternative mechanism.

Finally, in step (225), one may reassign codewords to each codeword bin according to their visual importance. That is:
if R_bin[i]==$X_j$
 assign $Y_j$=f($X_j$) codewords to the i-th bin,
where f($X_j$) denotes a mapping function that assigns more codewords to the most visually-important luminance bands. That is, for example, if $X_j>X_k$, then $f(X_j)>f(X_k)$.

For example, in an embodiment that uses a visual rating range of [0 5], one may apply the following codeword mapping strategy:
if R_bin[i]==0
 do not assign any codewords to the i-th bin
else if R_bin[i]==1
 assign M/2 codewords or the minimal number of codewords suggested by a content-adaptive algorithm (e.g., CAQ) to the i-th bin
else if R_bin[i]==2
 assign M codewords to the i-th bin
else if R_bin[i]==3
 assign (M+S)/2 codewords to the i-th bin
else if R_bin[i]≥4
 assign max(M,S) codewords to the i-th bin
where S denotes the number of codewords determined for the i-th bin using some other reshaping function (such as CAQ or the power mapping function of equation (1)) which typically does not take into account the visual importance indices.

Let $d_i$ (i=0, 1, 2, ..., N−1) denote the number of reshaped codewords assigned to each codeword bin; that is, ideally, after all codewords have been allocated, then $$D=\Sigma_{i=0}^{N-1} d_i = 2^{B_T}. \quad (5)$$

After this stage, since the number of available codewords is bounded by $2^{B_T}$, there are three possible scenarios. (a) If $D=2^{B_T}$, then the allocation process is complete and it terminates. (b) If $D>2^{B_T}$, then, in an embodiment, the number of allocated codewords in each bin is scaled down so that $$d_i = \frac{d_i}{\left(\frac{D}{2^{B_T}}\right)}. \quad (6)$$

(Note that $d_i$ values are not always integer.)

Finally, (c) if $D<2^{B_T}$, any unused codewords need to be reassigned to codeword bins according to some criterion. For example, in one embodiment, all unused codewords may be assigned to the bins within the most visually-important bands, starting with the band with the highest luminance. Alternatively, unused codewords may be spread evenly across all the visually-important bands.

Given the final codeword allocation, one then can generate either a look-up table (LUT) indicating how input codewords are mapped to reshaped codewords, or one can describe the reshaping function using other suitable means known in the art, such as a piece-wise linear or non-linear approximation. For example, in an embodiment, the forward reshaping function may be determined as:

$$FL(i) = clip3\left(round\left(\sum_{k=0}^{i} d_{floor\left(k*\frac{2^{(B_T-B_I)}}{M}\right)}/M\right), 0, 2^{B_T}-1\right), \quad (7)$$

for i=0, 1, 2, ..., $2^{B_I}$−1, where $B_I$ denotes the input bit depth. Typically, $B_I \geq B_T$; however, the same methodology may applied even when $B_I < B_T$. In equation (7), the value of j=floor(k*$2^{(B_T-B_I)}$/M) identifies the bin where the k-th input codeword belongs to. The function floor(x) denotes the largest integer not greater than x, round(x) denotes floor(x+0.5), and f=clip3(x, y, z) denotes that if x<y, f=y; else if x>z, f=z; else f=x.

Backward or Inverse Reshaping

In some embodiments, backward (inverse) reshaping (160) may be applied to reverse the effects of forward reshaping (150). In an embodiment, a look-up table (or an inverse reshaping function) for inverse reshaping may be constructed as follows:
a) Let FL( ) denote the forward reshaping function. For each codeword in the quantized domain ($s_c$), identify all input codewords ($v_i$) for which FL($v_i$)=$s_c$. Let this group be denoted as $\omega(s_c)=\{v_i | FL(v_i)=s_c\}$; then
b) Construct the backward reshaping function (BL($s_c$)) as a function of $\omega(s_c)$.
For example, in an embodiment, without limitation, BL($s_c$) may be constructed as the average of all codewords that belong to $\omega(s_c)$, or
if $|\omega(s_c)|>0$,
then $$BL(s_c) = \frac{\sum_{i \in \omega(s_c)} v_i}{|\omega(s_c)|}, \quad (8)$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values. In another embodiment, backward reshaping may be defined as min($\omega(s_c)$).

Figure 3:
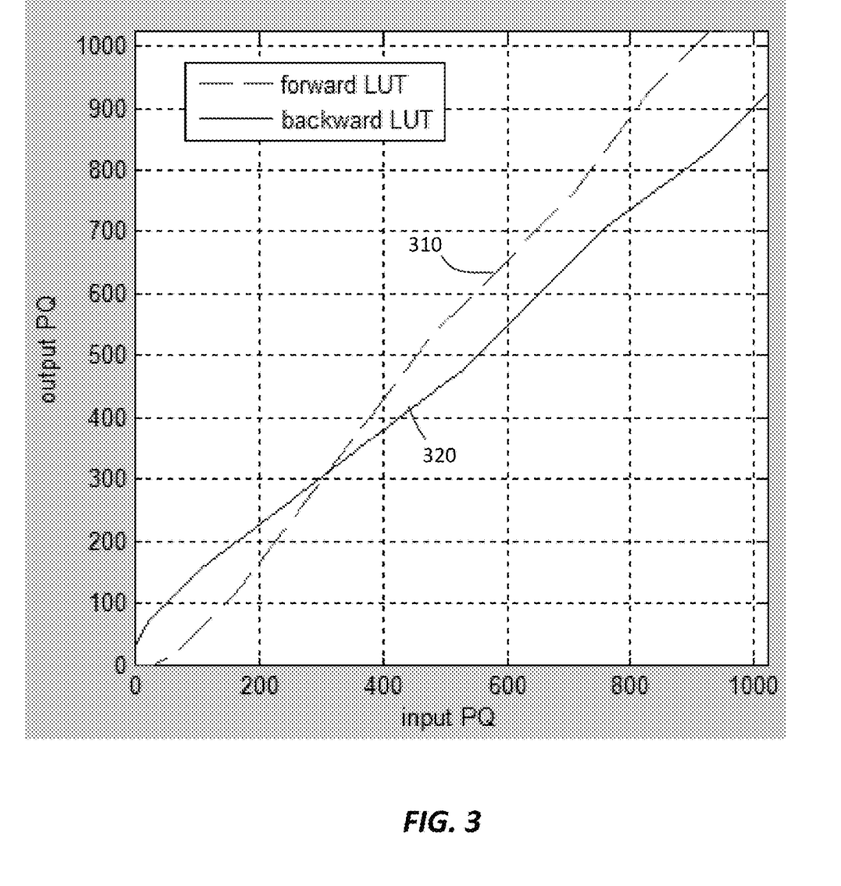
FIG. 3 depicts example forward and backward or inverse reshaping functions computed according to embodiments of this invention.

FIG. 3 depicts an example of forward (310) and backward (320) reshaping functions for a video frame and input pixel values coded according to the SMPTE ST 2084 EOTF.

Video Encoder Optimization Based on Signal Reshaping

The forward and backward reshaping techniques discussed earlier are applicable regardless of the coding (120) and decoding (130) algorithms being used. Furthermore, the same techniques can also be adapted to reshape as needed any or all of the chroma components of the input signal. In an embodiment, the subjective quality of a coded bitstream can be further improved if the quantizer within the encoder (120) can also take into consideration the characteristics of the forward reshaping function (150).

In U.S. patent application Ser. No. 14/933,679, filed on Nov. 5, 2015, "Rate control adaptation for high-dynamic range images," by T. Lu et al, which is incorporated herein by reference in its entirety, the inventors proposed to adjust the quantization parameter (commonly referred to as QP) of a coding block or coding unit (CU) using a QPdelta computed based on a function of the luminance characteristics of the block, i.e., $QP_{CU}=QP+QPdelta$. For example, for data encoded using ST 2084, QPdelta would be positive in the darks (increasing overall quantization) and QPdelta would be negative in the highlights (thus, decreasing overall quantization).

In an embodiment, an encoder may also take into consideration the visual importance indices discussed earlier to further improve the quality of the coded bitstream by reducing the quantization in the most visually-important bands. For example, in encoder (120), the following steps could be performed:

Determine the visual importance of each luminance range in the input. This can be done directly based on arrays band_edges and R (see equations (3) and (4)) or indirectly by analyzing the codeword distribution in either the forward reshaping function or the backward reshaping function Determine the QPdelta distribution for each band based on the computed visual importance metrics and other signal statistics (mean, variance, etc.)

For each coding unit (e.g., block or macroblock) adjust the quantization (QP) based on the luminance characteristics of this coding unit, e.g., based on the luminance band it belongs In case only the backward reshaping function is available, the encoder may reconstruct an approximation of the forward reshaping function using a reverse mapping.

Current codecs are optimized for signals without any reshaping (e.g., using a gamma-coded, YCbCr color space). Hence, when reshaping is used, encoders may work more efficiently if their quantizers are adjusted to take into consideration that the input is actually reshaped. In one embodiment, the QPdeltas are designed based on luminance and are applied in the encoder based on the characteristics of the forward reshaping function. In an embodiment, an encoder (120) may precompute an array of QPdeltas as a function of input luminance values (e.g., the average luminance in a coding unit). An example of such a mapping is depicted in Table 1, where input codewords are represented using 10-bit reshaped values.

TABLE 1

Example of QPdelta as a function of luminance

| Luma (nits) | 0 | 1 | 10 | 100 | 250 | 500 | 750 | 1000 |
|---|---|---|---|---|---|---|---|---|
| Input codeword | 0 | 153 | 307 | 520 | 616 | 692 | 737 | 769 |
| QPdelta | 3 | 2 | 1 | −3 | −2 | −3 | −2 | −3 |

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the signal reshaping of images with enhanced dynamic range, such as those described herein. The computer and/or IC may compute any of a variety of parameters or values that relate to the signal reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to signal reshaping of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient signal reshaping of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for content-adaptive signal reshaping of images with a processor, the method comprising:
   accessing with a processor an input image in an input bit depth;
   dividing output codeword values at a target bit depth into a plurality of codeword bins;
   dividing a luminance range of the input image into a plurality of luminance bands;
   assigning each of the codeword bins into one of the luminance bands;
   assigning a visual importance index to each of the luminance bands;
   assigning to each of the codeword bins the visual importance index of the luminance band it belongs; and
   for each codeword bin, allocating a number of codewords in the target bit depth according to a codeword mapping function and the visual importance index of the bin, wherein for a first bin with a visual importance index higher than the visual importance index of a second bin, the codeword mapping function allocates more codewords to the first bin than to the second bin;
   generating a forward reshaping function based on the codeword allocation in each codeword bin; and
   applying the forward reshaping function to the input image to generate an output image in the target bit depth.

2. The method of claim 1, wherein the number of codeword bins is a power of two.

3. The method of claim 1, wherein the luminance range is from 0 to 10,000 nits.

4. The method of claim 1, wherein boundaries of the plurality of luminance bands are determined using a band-edge array.

5. The method of claim 4, wherein the band-edge array comprises band_edges=[0 0.1 1 5 10 20 50 70 100 200 350 500 1,000 2,000 4,000 10,000].

6. The method of claim 1, wherein the visual importance indices range from 0 to 5, wherein 0 indicates the least visually important band.

7. The method of claim 6, wherein allocating codewords into codeword bins using the codeword mapping function comprises:
   if R_bin[i]==0
      do not assign any codewords to bin i
   else if R_bin[i]==1
      assign M/2 codewords to bin i
   else if R_bin[i]==2
      assign M codewords to bin i
   else if R_bin[i]==3
      assign (M+S)/2 codewords to bin i
   else if R_bin[i]≥4
      assign max(M,S) codewords to bin i,
   where for an output bit depth $B_T$ and N number of bins, $$M = \frac{2^{B_T}}{N},$$

R_bin[i] denotes the visual importance index for the i-th bin, and S denotes the number of codewords determined for the i-th bin according to a second reshaping function that does not take into account the visual importance indices.

8. The method of claim 7, wherein the second reshaping function comprises a power mapping function of the form $$y = a(x+b)^a + c.$$

9. The method of claim 1, further comprising, if after the allocation step there are unused codewords, the unused codewords are assigned to the bins within the band with the highest visual importance index, starting with the band with highest luminance.

10. The method of claim 1, further comprising, if after the allocation step there are unused codewords, the unused codewords are allocated across all the bands with 10 highest visual importance index.

11. The method of claim 1, further comprising:
   compressing the output image with an encoder to generate a compressed bit stream, wherein compressing a coding region of the output image comprises:
      determining a measure of luminance for the coding region;
      determining a region luminance band based on the measure of luminance for the coding region and a plurality of encoder luminance bands; and
      determining a delta quantization parameter for the coding region based on a measure of visual importance of the region luminance band.

12. The method of claim 11, wherein the measure of luminance comprises the average of luminance for pixel values in the coding region.

13. The method of claim 1, wherein generating the forward reshaping function FL(i) comprises computing $$FL(i) = clip3\left(round\left(\sum_{k=0}^{i} d_{floor(k * \frac{2^{(B_T - B_I)}}{M})}\right) / M\right), 0, 2^{B_T} - 1\right),$$

$$i = 0, 1, 2, \ldots, 2^{B_I} - 1,$$

where $d_j$ denotes the number of output codewords allocated to the j-th bin, i denotes a pixel value in the input image, $B_I$ denotes the input bit depth, and for an output bit-depth $B_T$ and N number of bins, $$M = \frac{2^{B_T}}{N}.$$

14. An apparatus comprising a processor and configured to perform the method recited in claim 1.

15. A non-transitory computer-readable storage medium having stored thereon computer-executable instruction for executing a method with one or more processors in accordance with claim 1.

* * * * *